(12) United States Patent
Birumachi

(10) Patent No.: US 8,508,176 B2
(45) Date of Patent: Aug. 13, 2013

(54) DRIVE APPARATUS FOR STEPPING MOTOR

(75) Inventor: Takashi Birumachi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 12/980,836

(22) Filed: Dec. 29, 2010

(65) Prior Publication Data

US 2011/0169442 A1 Jul. 14, 2011

(30) Foreign Application Priority Data

Jan. 13, 2010 (JP) ................................ 2010-004855

(51) Int. Cl.
*G05B 19/40* (2006.01)
(52) U.S. Cl.
USPC .......................................... 318/685; 318/696
(58) Field of Classification Search
USPC ..................... 318/685, 696, 400.35, 432, 434
See application file for complete search history.

(56) References Cited

U.S. PATENT DOCUMENTS

| | | | | |
|---|---|---|---|---|
| 6,388,416 B1 * | 5/2002 | Nakatani et al. | ............... | 318/700 |
| 6,812,667 B2 * | 11/2004 | Yasohara et al. | ............... | 318/599 |
| 7,166,975 B2 * | 1/2007 | Mori et al. | ............... | 318/400.36 |
| 2003/0198065 A1 * | 10/2003 | Hayashi et al. | ................. | 363/35 |
| 2009/0066278 A1 * | 3/2009 | Arisawa | .................... | 318/400.35 |

FOREIGN PATENT DOCUMENTS

| | | |
|---|---|---|
| JP | 04-265698 A | 9/1992 |
| JP | 06-225595 A | 8/1994 |
| JP | 08-182392 A | 7/1996 |
| JP | 11-132289 A | 4/1999 |
| JP | 2006-136149 A | 5/2006 |

* cited by examiner

*Primary Examiner* — Rina Duda
(74) *Attorney, Agent, or Firm* — Fitzpatrick, Cella, Harper & Scinto

(57) ABSTRACT

A drive apparatus for a stepping motor, including: a current detecting portion which detects a current value of phase current flowing through a phase winding; a constant-current-controlling portion which constant-current-controls the phase current flowing through the phase winding based on a detection result of the current detecting portion; a zero crossing detecting portion which detects a zero cross of the phase current based on the detection result of the current detecting portion; a phase difference detecting portion which detects a phase difference between the edge of a drive control pulse signal for the stepping motor and the zero cross detected by the zero crossing detecting portion; and a control device which causes the constant-current-controlling portion to perform constant-current control with a current value according to the phase difference detected by the phase difference detecting portion.

5 Claims, 8 Drawing Sheets

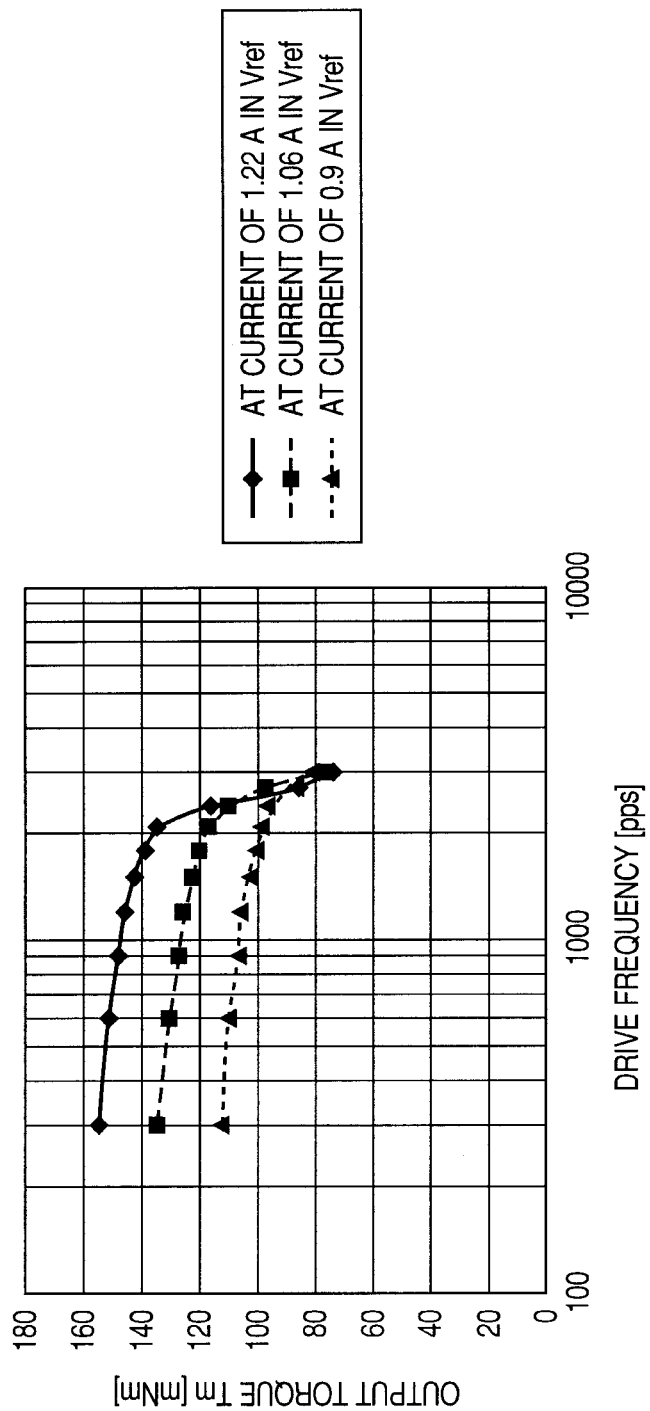

ENTIRE VIEW AT TRAPEZOID DRIVE

ENLARGED VIEW AT STARTUP

DRIVE APPARATUS FOR STEPPING MOTOR

BACKGROUND OF THE INVENTION

1. Field of the Invention

The present invention relates to a drive apparatus configured to constant-current-control a winding current of a stepping motor.

2. Description of the Related Art

The use of a stepping motor provides an advantage of enabling an open-loop control including a position control based on a pulse count of command pulses (a drive control pulse signal) and a speed control based on an inter-pulse period of the command pulses. On the other hand, however, there is a disadvantage that if a load torque exceeds an allowable output torque range of the stepping motor, the stepping motor may fall into a state called step-out, in which the stepping motor cannot be synchronized with the command pulses and rotate normally. In order to prevent the step-out, a load torque necessary for a real machine is usually set within an output torque range in which the stepping motor does not lose steps. Then, in a constant-current-controlling circuit for driving the stepping motor, it is a general manner to set a current value for generating an output torque within the output torque range free from the step-out. In a case where the load torque changes depending on various conditions, a certain margin (called torque margin) is set so as to generate an output torque prepared for the change in load torque. However, providing a sufficient torque margin may produce a too-large output torque with respect to the load torque so that the rotor undergoes a repeated phenomenon of rotating too much and turning back in response to a single command pulse, resulting in vibration. Aimed at solving this problem, there have been proposed a method involving switching a current setting value according to a drive situation (an expected load state) (Japanese Patent Application Laid-Open No. H04-265698) and a method involving switching a phase exciting operation according to the drive situation (Japanese Patent Application Laid-Open No. 2006-136149).

Meanwhile, in order to solve the disadvantage inherent in the open-loop control, there has been proposed a stepping motor drive apparatus employing a closed-loop control using a position/speed detecting unit (encoder, resolver, etc.) (Japanese Patent Application Laid-Open No. H06-225595 and Japanese Patent Application Laid-Open No. H08-182392). Further, aimed at solving the problems of control delay and poor stability, which are the disadvantages of the closed-loop control, it has been also proposed to switch the motor control from the open-loop control for normal use to the closed-loop control only when the motor is liable to lose steps (Japanese Patent Application Laid-Open No. H11-113289).

The technologies described in Japanese Patent Application Laid-Open No. H04-265698 and Japanese Patent Application Laid-Open No. 2006-136149 set a hard-coded value for the motor-applied load torque with respect to a maximum torque expected in an operation sequence including an accelerating period, a constant-speed period, and a decelerating period. Those technologies set the hard-coded value so as to reduce the loss, vibration, and heat generation, merely aiming at the improvement within an expected range including a certain margin. Therefore, even switching the current setting value or the phase exciting operation depending on the drive situation cannot avoid a case difficult to respond to unexpected load fluctuations.

To attain a margin-less drive method unlike using the hard-coded value, Japanese Patent Application Laid-Open No. H06-225595, Japanese Patent Application Laid-Open No. H08-182392, and Japanese Patent Application Laid-Open No. H11-113289 have proposed a drive method incorporating the closed-loop control, which employs a synchronous motor drive method using a sensor for detecting a position/speed. However, the additional position/speed detecting unit for the closed-loop control is responsible for an increase in apparatus size and cost.

SUMMARY OF THE INVENTION

It is an object of the present invention to provide a drive apparatus for a stepping motor, which performs a current control according to an actual load torque to prevent step-outs or vibrations, without providing a sensor for detecting a position/speed of a shaft of the stepping motor.

In order to achieve the above-mentioned object, a drive apparatus for a stepping motor according to the present invention includes: a current detecting portion configured to detect a current value of phase current flowing through a phase winding; a constant-current-controlling portion configured to constant-current-control the phase current flowing through the phase winding based on a detection result of the current detecting portion; a zero crossing detecting portion configured to detect a zero cross of the phase current based on the detection result of the current detecting portion; a phase difference detecting portion configured to detect a phase difference between the edge of a drive control pulse signal for the stepping motor and the zero cross detected by the zero crossing detecting portion; and a control device configured to cause the constant-current-controlling portion to perform a constant-current control with a current value according to the phase difference detected by the phase difference detecting portion.

According to the present invention, it is possible to perform the current control according to an actual load torque to prevent step-outs or vibrations, without providing a sensor for detecting the position/speed of the shaft of the stepping motor.

Further features of the present invention will become apparent from the following description of exemplary embodiments with reference to the attached drawings.

BRIEF DESCRIPTION OF THE DRAWINGS

FIG. 4 is a graph illustrating output torque characteristics of a stepping motor measured by a torque converter.

DESCRIPTION OF THE EMBODIMENT

Embodiment (Motor Driver IC 300)

Figure 2:
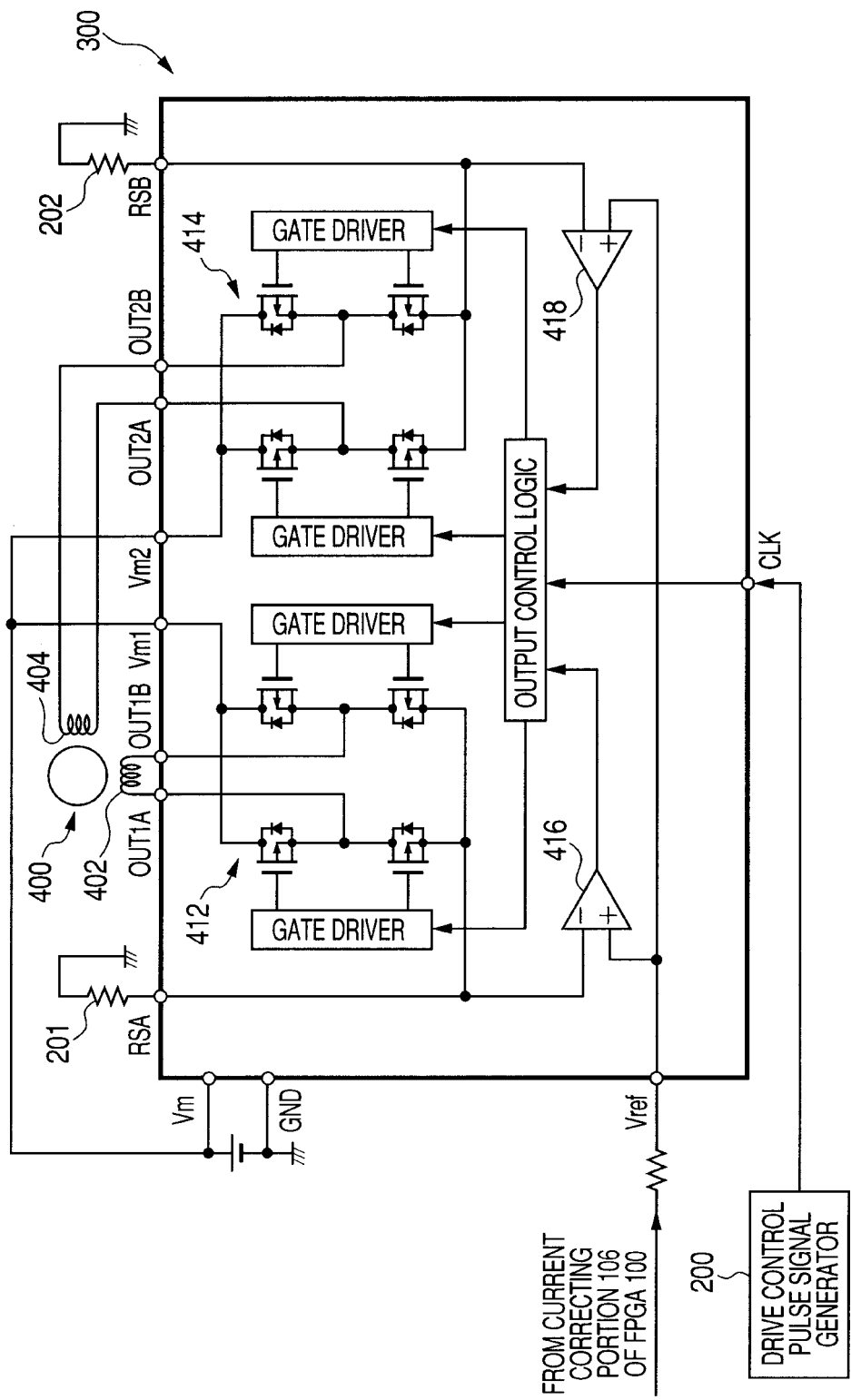
FIG. 2 is a block diagram illustrating an internal circuit of a stepping motor driver IC (an article on the market).

First, a motor driver IC (constant-current-controlling portion) 300 with constant-current control as used in an embodiment of the present invention will be briefly described with reference to FIG. 2. FIG. 2 is a block diagram illustrating a typical internal circuit of the two-phase stepping motor driver IC 300. Every time the motor driver IC 300 receives a drive control pulse signal CLK from a drive control pulse signal generator 200, the motor driver IC 300 switches an exciting phase to rotate a rotor of a two-phase stepping motor 400. The motor driver IC 300 with constant-current control performs a constant-current control so that a phase-A current flowing through a phase-A winding 402 of the two-phase stepping motor 400 and a phase-B current flowing through a phase-B winding 404 thereof may take a predetermined current value set to a current setting terminal Vref. Specifically, the phase-A winding 402 and the phase-B winding 404 are respectively connected to H-bridges 412 and 414 composed of semiconductor switch elements (used herein are MOS-FETs). Respective values of the currents flowing through the phase-A winding 402 and the phase-B winding 404 are detected by a phase-A current detecting resistor (a phase-A current detecting portion for a constant-current control) 201 and a phase-B current detecting resistor (a phase-B current detecting portion for a constant-current control) 202. Differential amplifiers 416 and 418 respectively compare the current value detected by the phase-A current detecting resistor 201 and the current value detected by the phase-B current detecting resistor 202 with the predetermined current value of the current setting terminal Vref. The ON/OFF ratio of each of the semiconductor switch elements included in the H-bridges 412 and 414 is determined so that the currents flowing through the phase-A winding 402 and the phase-B winding 404 may take the predetermined current value. This configuration represents a pulse width control portion configured to perform the so-called constant-current pulse width modulation (PWM) control. In general, the pulse width control portion is designed to set, to the current setting terminal Vref, a hard-coded current value for outputting a torque larger by a margin than a previously-expected load torque Tl. Therefore, if the load torque Tl differs from the expected one, step-out or vibration occurs. As a countermeasure, in the embodiment of the present invention, the load torque Tl is determined based on a zero-crossing timing of the current values detected by the phase-A current detecting resistor 201 and the phase-B current detecting resistor 202. A current value for outputting a torque larger by a margin than the thus determined load torque Tl is determined. A voltage corresponding to the thus determined current value is applied to the current setting terminal Vref. In other words, a control value corresponding to the current value for outputting the thus determined torque is set to the current setting terminal Vref.

(Method of Detecting Load Torque)

Next, a method of detecting the load torque by the phase currents of the stepping motor as used in the present invention will be described with reference to FIGS. 3 to 5B. In general, there is a proportional relation between a current and a torque of the motor in a steady state. However, because the motor has power generation characteristics proportional to its own speed, an output torque changes depending on a drive frequency (a rotation speed) as illustrated in FIG. 4. FIG. 4 illustrates output torque characteristics of the stepping motor measured using a torque converter. A current of 1.22 A, 1.06 A, or 0.9 A is set to the current setting terminal Vref of the motor driver IC 300. FIG. 4 illustrates a relation of an output torque Tm to the drive frequency when the current value set to the current setting terminal Vref is changed. In the embodiment of the present invention, such characteristic information is held in the form of a table, and by referring to the table, a current value necessary for generating an output torque Tm at a certain drive frequency is determined.

Figure 3:
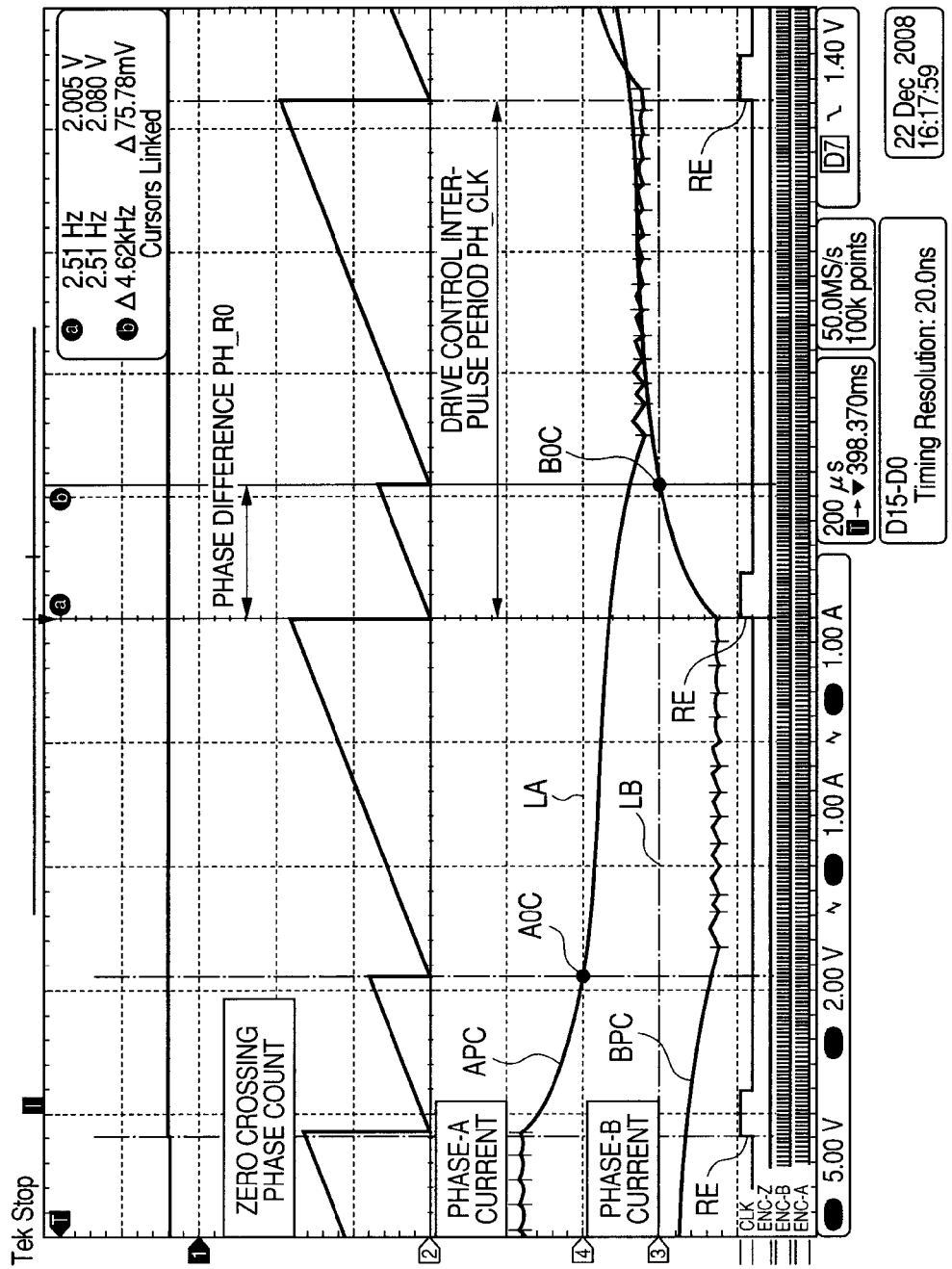
FIG. 3 is a view illustrating an operation of detecting a zero crossing phase difference.

Meanwhile, when a load is applied to an output shaft of the stepping motor, there is an offset angle of an actual position (a control amount) of the rotor with respect to the drive control pulse signal CLK, which is the position command and the speed command. Such an offset angle is generally called a load angle. The embodiment of the present invention provides a configuration capable of calculating a value corresponding to the load angle based on a relation between the drive control pulse signal CLK and the current phase. FIG. 3 is a view illustrating an operation of detecting a zero crossing phase difference. A zero crossing phase difference PH_R0 is, as illustrated in FIG. 3, a period from a rising edge RE of the drive control pulse signal CLK to a zero cross (zero-crossing point) B0C (A0C) of the current. The zero cross represents a moment at which the current value becomes zero in the course of the switch of the phase current from positive to negative or from negative to positive. In FIG. 3, the curve APC represents the phase-A current. The broken line LA represents zero of the current value of the phase-A current. The point A0C represents the zero cross of the phase-A current. The curve BPC represents the phase-B current. The broken line LB represents zero of the current value of the phase-B current. The point B0C represents the zero cross of the phase-B current. Note that, the rising edge RE of the drive control pulse signal CLK is a reference to an electric degree switching operation of the motor driver IC 300, and the reference may be a falling edge instead. Based on the zero crossing phase difference PH_R0 and an associated drive control inter-pulse period (a period between a rising edge and a rising edge) PH_CLK, a phase difference ratio (=a zero crossing phase difference divided by a drive control inter-pulse period) is determined. The reason why the phase difference ratio is determined is that the correlation between the zero crossing phase difference and the load torque Tl is to be obtained easier. The phase difference ratio may be determined by, as described later, dividing a phase difference count value Ph_cont of a counter included in a phase difference detecting portion 105 by a period count value CLK_prd of a counter included in a period measuring portion 104.

Figure 5A:
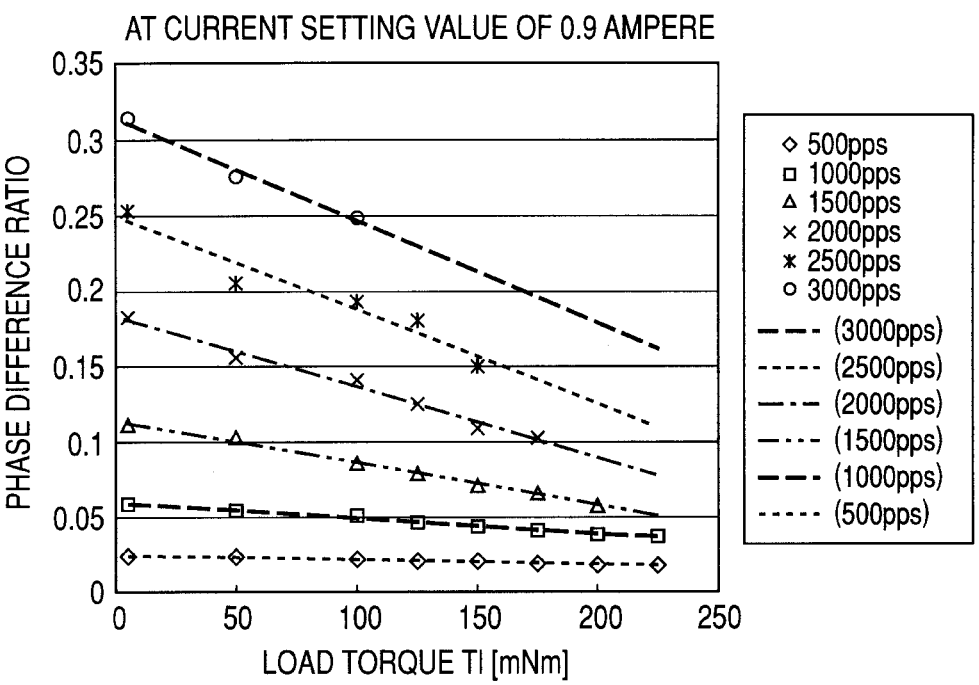
FIGS. 5A and 5B are characteristic graphs each illustrating a relation between a load torque and a phase difference ratio when a drive frequency is changed.
Figure 5B:
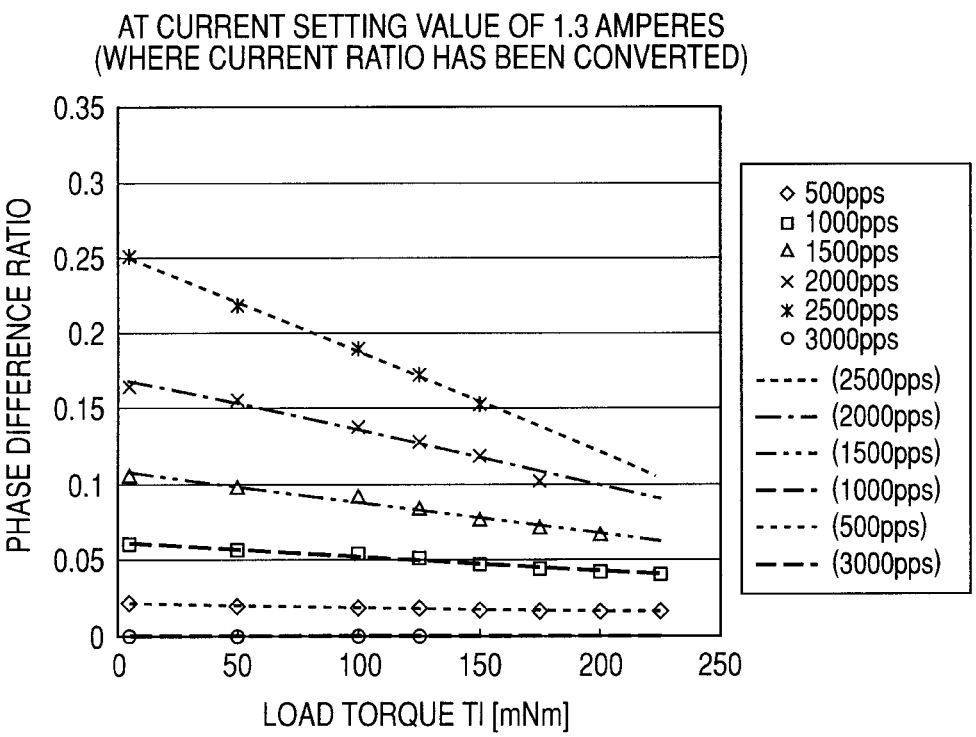

FIGS. 5A and 5B are characteristic graphs each illustrating the relation of the phase difference ratio to the load torque Tl when the drive frequency of the stepping motor is changed. In FIGS. 5A and 5B, the axis of ordinate represents the phase difference ratio and the axis of abscissa represents the load torque Tl applied to the shaft of the stepping motor. FIG. 5A is a characteristic graph obtained when a current value of 0.9 ampere (A) is set to the current setting terminal Vref of the motor driver IC 300. FIG. 5B is a characteristic graph obtained when a current value of 1.3 amperes (A) is set to the current setting terminal Vref. In the embodiment of the present invention, such characteristic information is held in the form of a table, and by referring to the table, the load torque Tl is determined based on the thus determined phase difference ratio and the drive frequency. Then, as described above, a current value necessary for generating the output torque Tm, which is larger by a margin than the load torque Tl, is determined by referring to the table indicating the characteristics illustrated in FIG. 4, and a voltage corresponding to the current value is applied to the current setting terminal Vref.

Note that, the phase difference ratio illustrated in the graphs of FIGS. 5A and 5B takes into account current suppression due to a counter-electromotive force, which is generated in proportion to the drive frequency (i.e. a motor rotation speed). By the way, it is known that a driven motor generally has the relation expressed by the following expression.

$$I \cdot R + L \cdot dI/dt + em = Vin \quad \text{(Expression 1)}$$

where Vin is an input voltage, em is a counter-electromotive force, R is a winding resistance, I is a winding current, and L is a winding inductance.

The counter-electromotive force em is proportional to a motor rotation speed ω and expressed by the following expression.

$$em = Ke \cdot \omega \quad \text{(Expression 2)}$$

where Ke is a counter-electromotive force constant.

Further, the output torque Tm of the motor is proportional to a current, and the relation between the output torque Tm and a motor current Im when the load torque Tl is connected is expressed by the following expression.

$$Tm = Kt \cdot Im \quad \text{(Expression 3)}$$

where Kt is a torque constant.

When the motor rotation speed ω of the stepping motor is in a low/medium speed range, for example, in a range where the drive frequency illustrated in FIG. 4 is 2,000 pps or lower, the winding current is constant-current-controlled. Accordingly, the counter-electromotive force less affects the torque reduction. In this range, the suppression of current change owing to the winding inductance is largely affected by the motor rotation speed ω. The phase difference ratio (PH_R0/PH_CLK), which is determined by the zero crossing phase difference PH_R0 of the current and the associated drive control inter-pulse period PH_CLK, is largely affected by the motor rotation speed ω. As illustrated in FIGS. 5A and 5B, when no load is applied, the phase difference ratio largely changes depending on the motor rotation speed (the drive frequency). Further, accompanying the increase in load torque Tl, a current effective value changes to become larger, so that the phase difference ratio exhibits the inverse proportional relation to the load torque Tl.

On the other hand, when the motor rotation speed ω of the stepping motor is in a high speed range, for example, in a range where the drive frequency illustrated in FIG. 4 is higher than 2,000 pps, the torque abruptly reduces because of the influence of the counter-electromotive force. As expressed by Expression 2, the counter-electromotive force em is proportional to the motor rotation speed ω. If the counter-electromotive force constant Ke is known, an allowable supply current to the motor winding is determined by a winding impedance Z (=R+jωL) and the following expression.

average current in operation:current at rest=$(Vin-Ke\cdot\omega)/Z:Vin/Z$

By correcting thus determined magnification of the phase difference ratio accompanying the current reduction due to the counter-electromotive force, which is dependent on speed, it is possible to obtain the relation between the load torque Tl and the phase difference ratio, similarly to the low/medium speed range.

As stated above, the corrected phase difference ratio exhibits a substantially linear, inverse proportional relation to the load torque Tl as illustrated in FIGS. 5A and 5B. The graph of FIG. 5B illustrates the characteristics when the constant-current control value is changed from the graph of FIG. 5A (FIG. 5B shows 1.3 A, whereas FIG. 5A shows 0.9 A), in which the correction in terms of current ratio (0.9/1.3) has been made. When the correction is made in terms of speed ratio of the counter-electromotive force component and current ratio in the constant-current control, it is possible to obtain the same relation as to the change in phase difference ratio with respect to the load torque.

(Configuration of Correction Control Circuit 500)

Figure 1:
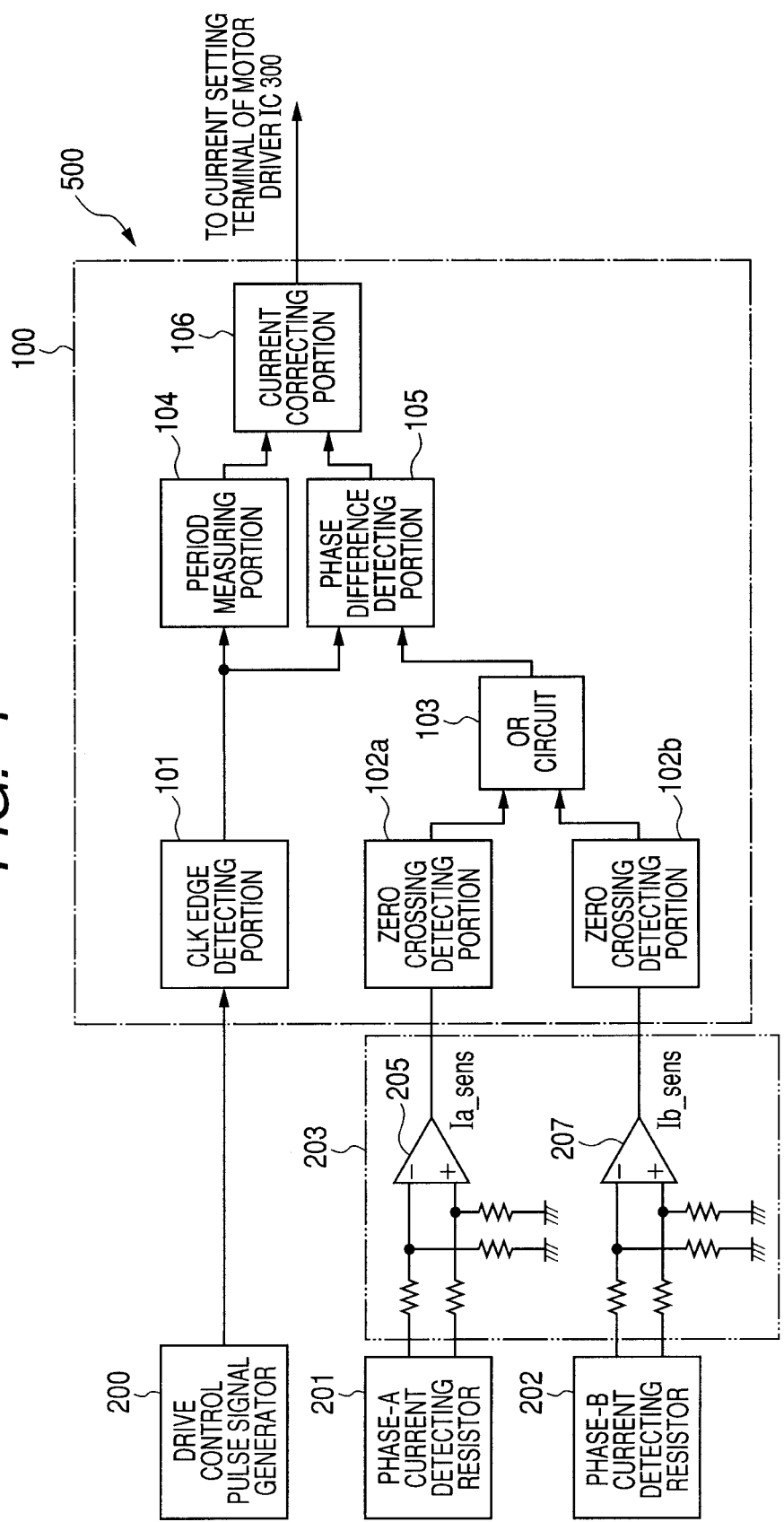
FIG. 1 is a block diagram illustrating a correction control circuit according to an embodiment of the present invention.

FIG. 1 is a block diagram of a correction control circuit 500 according to the embodiment of the present invention. In the embodiment of the present invention, the drive apparatus for a stepping motor includes the motor driver IC 300 and the correction control circuit 500. In the correction control circuit 500, a current detecting stage includes the phase-A current detecting resistor 201, the phase-B current detecting resistor 202, and a current detecting portion for zero cross detection 203 at a current detecting stage. The section other than the current detecting stage (the block designated by the reference numeral 100 of FIG. 1) is constituted by a hardware circuitry using a field programmable gate array (FPGA) 100. Inside the FPGA (hereinafter referred to as a correction control portion) 100, the period measuring portion 104 and the phase difference detecting portion 105 each basically includes a counter using a reference clock of the correction control portion 100. The phase-A current flowing through the phase-A current detecting resistor 201 is amplified by an amplifier (a comparator) 205 included in the current detecting portion 203 for zero cross detection, which is then output as a phase-A current signal Ia_sens. A phase-A current zero crossing detecting portion 102a detects a zero-crossing point (a zero cross) of the phase-A current signal Ia_sens. The phase-B current flowing through the phase-B current detecting resistor 202 is amplified by an amplifier (a comparator) 207 included in the current detecting portion 203 for zero cross detection, which is then output as a phase-B current signal Ib_sens. A phase-B current zero crossing detecting portion 102b detects a zero-crossing point (a zero cross) of the phase-B current signal Ib_sens. In the embodiment of the present invention, the phase-A current zero crossing detecting portion 102a and the phase-B current zero crossing detecting portion 102b are included in the correction control portion 100, but the present invention is not limited to this configuration. For example, there may be adopted a configuration in which the values detected by the phase-A current detecting resistor 201 and the phase-B current detecting resistor 202 are each supplied to an external comparator to constitute a zero crossing detecting portion, and its detection results (Hi/Low) are input to the correction control circuit 500.

(Operation of Detecting Phase Difference)

Figure 6:
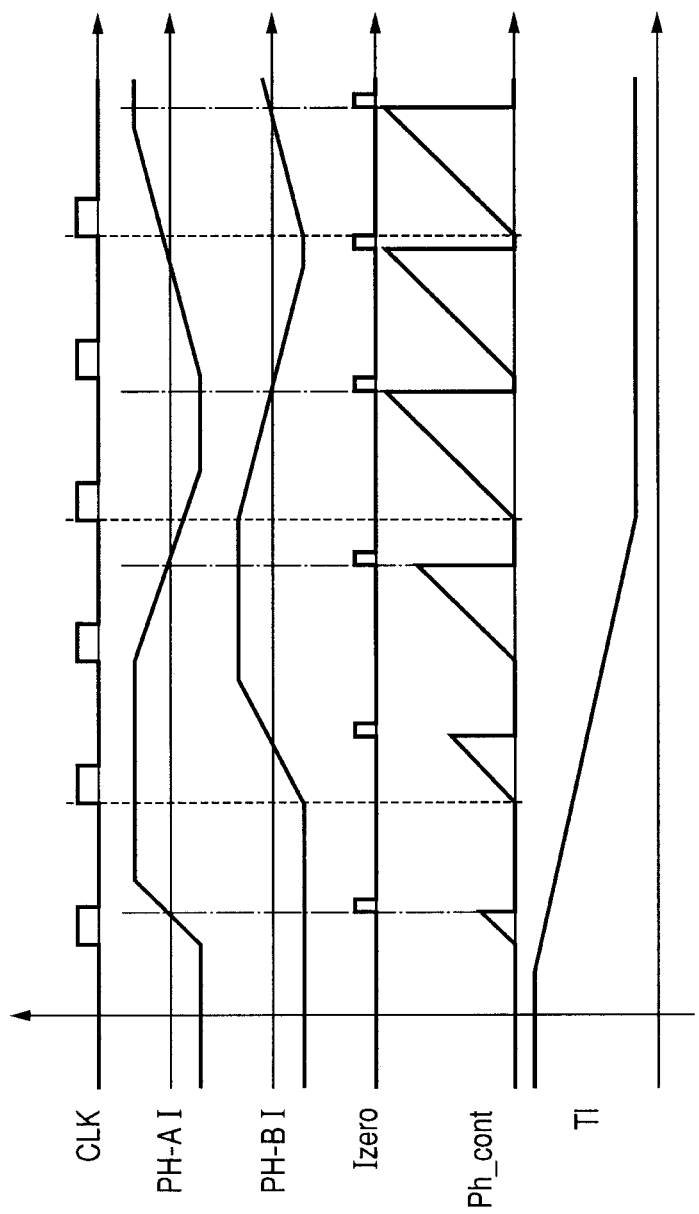
FIG. 6 is a graph illustrating an operation of detecting a phase difference.

Next, an operation of detecting the phase difference by the correction control circuit 500 illustrated in FIG. 1 will be described with reference to FIG. 6. The phase difference count and the like is as described above with reference to FIG. 3. FIG. 6 schematically illustrates how the load torque Tl and a zero crossing detection signal Izero change. Referring to FIG. 1, the drive control pulse signal generator 200 generates the drive control pulse signal CLK as the position command and the speed command to the stepping motor. A CLK edge detecting portion 101 detects a rising edge of the drive control pulse signal CLK. When the CLK edge detecting portion 101 detects the rising edge of the drive control pulse signal CLK, each of the counters of the period measuring portion 104 and the phase difference detecting portion 105 is reset. The counters are each configured to count in units (here, 40 MHz) of the reference clock of the correction control portion 100. The counter of the period measuring portion 104 continues counting until the next rising edge of the drive control pulse signal CLK is detected. When the next rising edge is detected, the period measuring portion 104 holds the period count value CLK_prd at that time in a register and resets the counter. The period count value CLK_prd corresponds to the above-mentioned drive control inter-pulse period (the period between a rising edge and a rising edge) PH_CLK, and is a numerical value representing the drive control inter-pulse period PH_CLK in terms of the number of counts. On the other hand, the counter of the phase difference detecting portion 105 continues counting from the time of reset until the zero-crossing point is detected. An OR (logical sum) circuit 103 implements a logical sum of the detection results of the phase-A current zero crossing detecting portion 102a and the phase-B current zero crossing detecting portion 102b. When a zero-crossing point of a phase-A current PH-A_I or a zero-crossing point of a phase-B current PH-B_I is detected, the OR circuit 103 outputs the zero crossing detection signal Izero. When the phase difference detecting portion 105 receives the zero crossing detection signal Izero from the OR circuit 103, the phase difference detecting portion 105 holds the phase difference count value Ph_cont at that time in a register and resets the counter. The phase difference count value Ph_cont corresponds to the above-mentioned zero crossing phase difference PH_R0, and is a numerical value representing the zero crossing phase difference PH_R0 in terms of the number of counts. In the embodiment of the present invention, the CLK edge detecting portion 101 detects the rising edge of the drive control pulse signal CLK, but the present invention is not limited thereto. For example, the CLK edge detecting portion 101 may detect a falling edge of the drive control pulse signal CLK. Then, with reference to the falling edge, the period measuring portion 104 may detect the period count value CLK_prd and the phase difference detecting portion 105 may detect the phase difference count value Ph_cont.

(Current Correcting Portion (Control Device) 106)

Next, the period count value CLK_prd and the phase difference count value Ph_cont, which are held in the respective registers, are input to a current correcting portion (control device) 106. The current correcting portion 106 carries out the following processing.

(1) The drive frequency is calculated by multiplicative inverse operation of the period count value CLK_prd of the drive control pulse signal CLK.
(2) The phase difference ratio (CLK_prd divided by Ph_cont) is calculated from the period count value CLK_prd and the phase difference count value Ph_cont.
(3) The load torque Tl applied to the rotating shaft of the stepping motor is determined based on the drive frequency calculated in (1) and the phase difference ratio calculated in (2). The load torque Tl is determined using the table or operational expression indicating the relation of the phase difference ratio to the load torque Tl when the drive frequency is changed as illustrated in FIGS. 5A and 5B. In this case, the phase difference ratio is corrected as described above based on the speed ratio (the drive frequency ratio) and the current ratio and is thereafter utilized for calculation.
(4) A current value to be set to the current setting terminal Vref is determined based on the drive frequency calculated in (1) and the load torque Tl calculated in (3). The current value is determined using the table or operational expression indicating the relation of the output torque Tm to the drive frequency when the current value set to the current setting terminal Vref is changed as illustrated in FIG. 4.
(5) In calculating the correction current value, in a case where the stepping motor has a wide operating range, the correction current value is calculated in a range higher than a predetermined rotation speed based on the table of the counter-electromotive force characteristics of the stepping motor, a speed correction ratio, or an approximate expression for the calculation.
(6) A voltage corresponding to the correction current value calculated in (4) or the correction current value calculated in (5) is output to the current setting terminal Vref of the driver IC 300.

Through the above-mentioned processing, a constant-current control command value of the current to be supplied to the motor winding of the stepping motor (the predetermined value of the current to be applied to the current setting terminal Vref of the driver IC 300) may be corrected according to the load torque.

(Comparison between Phase Difference Ratio According to Embodiment and Location Deviation by Encoder)

Figure 7A:
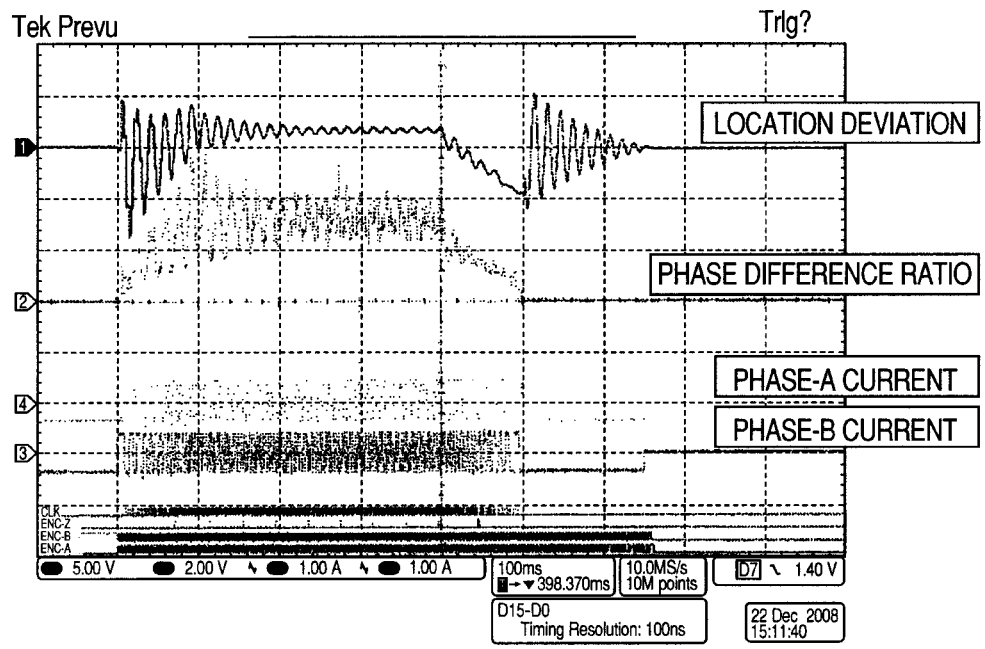
FIGS. 7A, 7B, and 7C are views showing comparison between the phase difference ratio according to the embodiment of the present invention and a location deviation obtained by an encoder.
Figure 7B:
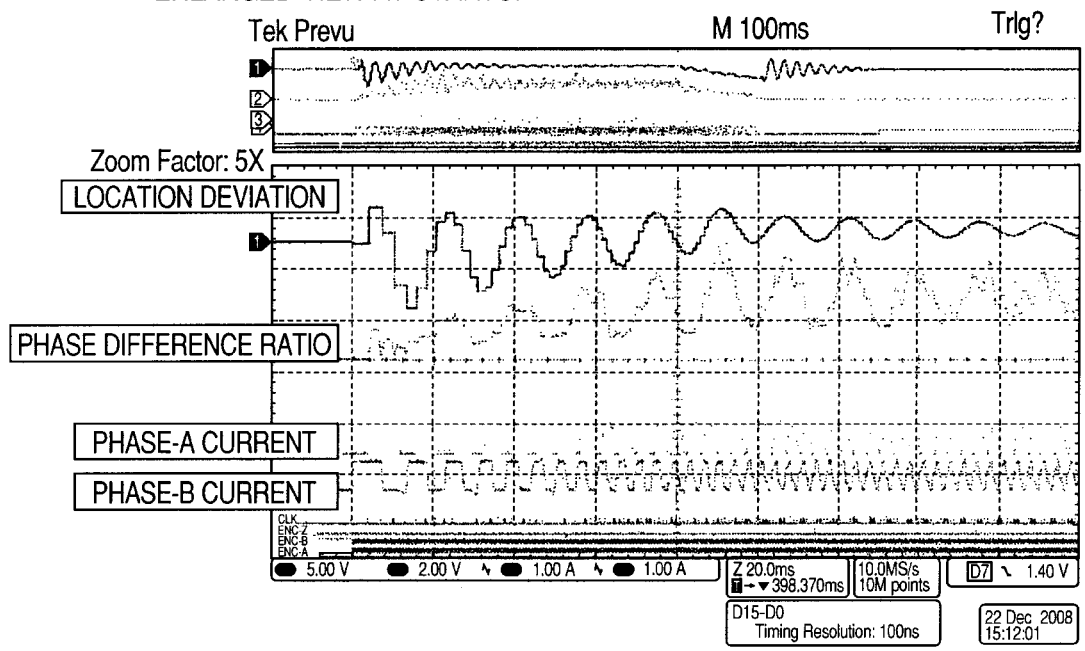
Figure 7C:
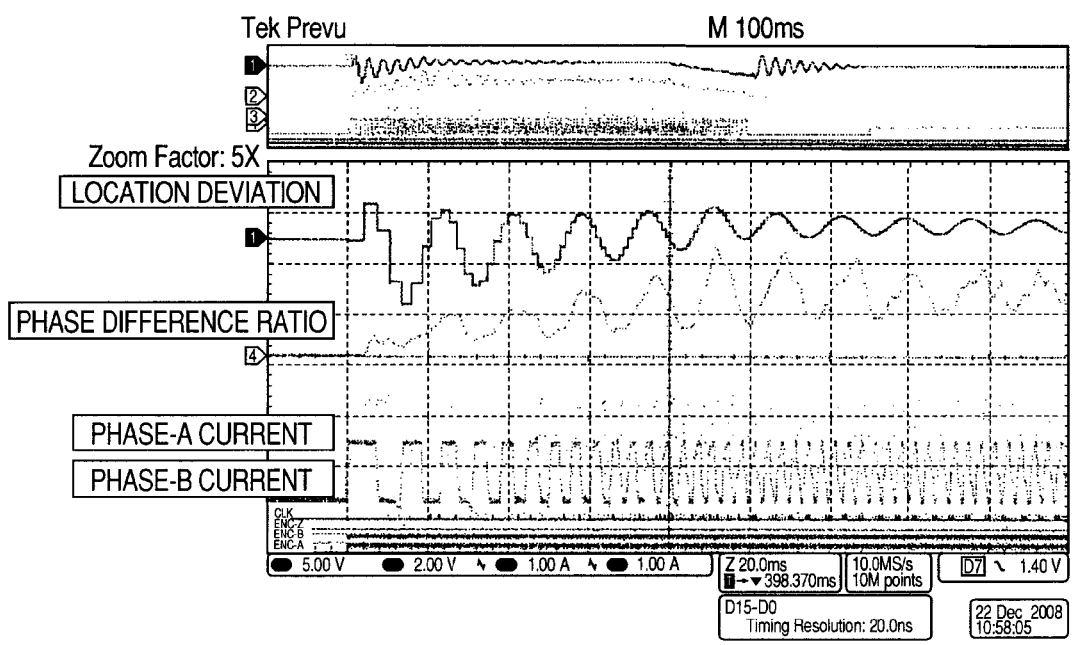

FIGS. 7A to 7C are views for comparison between the phase difference ratio according to the embodiment of the present invention and a location deviation obtained by an encoder. FIG. 7A is an entire view at a trapezoid drive. FIG. 7B is an enlarged view at startup. FIG. 7C is a view at a low-pass filter process. The phase difference ratio of FIGS. 7A to 7C reflects the result of detecting the change in load torque through the above-mentioned processing from (1) to (5). The location deviation of FIGS. 7A to 7C reflects the result of measuring a deviation amount (delay side is "+") of an actual rotating position with respect to the drive control pulse signal CLK by using the encoder attached to the motor shaft. As can be seen from FIGS. 7A and 7B, the zero crossing phase difference ratio of the phase currents represents a value which is substantially proportional to the deviation amount detected by the encoder. However, an actual phase current is under the constant-current PWM control by switching and accordingly contains much noise. Therefore, as illustrated in FIG. 7B, the phase difference ratio has a tendency to exhibit a large degree of change as compared to the location deviation. In actual use, although it is conceivable to employ a feedback control by a proportional-integral-derivative (PID) control, an appropriate low-pass filter or the like absolutely needs to be applied to the noise component in the current detecting portion in order to remove the influence on a differential component (D-control). FIG. 7C illustrates an output state of the phase difference ratio when the low-pass filter process is applied.

Note that, as a maximum current rating is set for a general driver IC, it is desired to provide an upper limit value to limit the output of the correction value.

As described above, the present invention enables the change in load torque to be detected based on the phase current information obtained by the current detecting portion for the constant-current control of the stepping motor. Therefore, without using a rotor position detecting unit, the command value for the constant-current control may be corrected according to the load torque. In this way, the drive current may be optimized to reduce the loss as the drive apparatus and suppress the vibration of the motor caused by an excessive torque.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-004855, filed Jan. 13, 2010, which is hereby incorporated by reference herein in its entirety.

What is claimed is:

1. A drive apparatus for a stepping motor, comprising:
a current detecting portion configured to detect a current value of phase current flowing through a phase winding;
a constant-current-controlling portion configured to constant-current-control the phase current flowing through the phase winding based on a detection result of the current detecting portion;
a zero crossing detecting portion configured to detect a zero cross of the phase current based on the detection result of the current detecting portion;
a phase difference detecting portion configured to detect a phase difference between an edge of a drive control pulse signal for the stepping motor and the zero cross detected by the zero crossing detecting portion; and
a control device configured to cause the constant-current-controlling portion to perform a constant-current control with a current value according to the phase difference detected by the phase difference detecting portion.

2. A drive apparatus for a stepping motor according to claim 1, further comprising a period measuring portion configured to detect an inter-edge period with reference to a rising edge or a falling edge of the drive control pulse signal for the stepping motor,
wherein the control device causes the constant-current-controlling portion to perform the constant-current control with the current value corresponding to a phase difference ratio, which is a ratio of the phase difference to the inter-edge period, and corresponding to a drive frequency of the stepping motor.

3. A drive apparatus for a stepping motor according to claim 2, wherein the control device determines a load torque based on the phase difference ratio and the drive frequency, and causes the constant-current-controlling portion to perform the constant-current control with the current value based on the load torque.

4. A drive apparatus for a stepping motor according to claim 3, wherein the control device determines the load torque from a table or an approximate expression representing a relation among the drive frequency, the phase difference ratio, and the load torque.

5. A drive apparatus for a stepping motor according to claim 2, wherein the control device determines the drive frequency based on the inter-edge period.

* * * * *